July 25, 1967   M. LEHMACHER ETAL   3,332,324
METHOD AND APPARATUS FOR THE MANUFACTURE OF A COMBINED WEB
OF MATERIAL SUITABLE FOR THE MANUFACTURE OF POUCHES
Filed Feb. 20, 1964
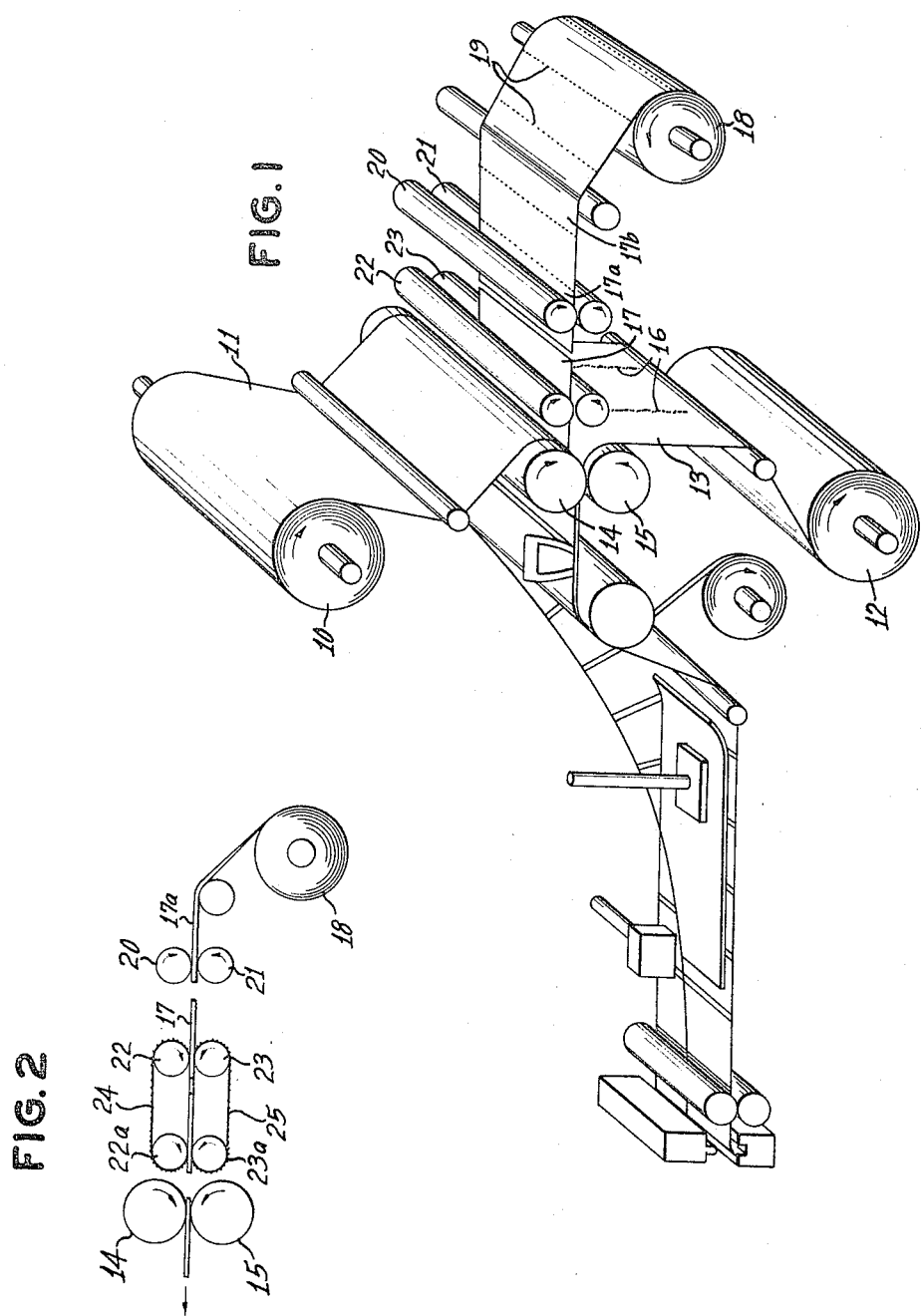
INVENTORS
Michael Lehmacher
BY Johann M. Lehmacher
James E. Bryan
ATTORNEY 3,332,324
METHOD AND APPARATUS FOR THE MANU-
FACTURE OF A COMBINED WEB OF MATE-
RIAL SUITABLE FOR THE MANUFACTURE OF
POUCHES
Michael Lehmacher and Johann M. Lehmacher, Mondorf
uber Troisdorf, Germany, assignors to Kalle Aktienge-
sellschaft, Wiesbaden-Biebrich, Germany, a corporation
of Germany
Filed Feb. 20, 1964, Ser. No. 346,192
13 Claims. (Cl. 93—8)

This invention relates to a method and apparatus for the manufacture of a combined web of material suitable for the manufacture of pouches.

Copending application Ser. No. 168,598, filed Jan. 23, 1962, discloses a method for the manufacture of pouches in which two webs of thermoplastic material are brought together with individual sheet inserts placed between them in spaced relation, the webs laterally overlapping the inserts, and the webs are longitudinally joined at the edges by welding. To form the pouches, the combined web produced is longitudinally folded to form a partly doubled web, transversely welded between adjacent inserts and separated along and within the transverse welds.

A pouch thus formed has a flap for overlapping and each pouch includes an insert between two sealed layers of thermoplastic material.

According to the present invention, in the production of a combined web by the method above described, the individual sheet inserts are positioned between the thermoplastic webs by supplying the insert material in the form of a web with longitudinally spaced transverse weakening means and introducing it between the thermoplastic webs in such a manner that individual sheet inserts are detached from the web of insert material and spaced apart between the thermoplastic webs.

The resulting combined web is suitable for conversion into pouches as above described. As in the copending application, supra, the production of the combined web and of pouches therefrom can be a continuous process.

The present invention also provides an apparatus for the manufacture of the combined web and of pouches therefrom.

The method and apparatus of the invention have the advantages that it is possible to provide adjustment so that the width of the insert is less dependent on the dimensions and arrangements of the means for feeding the insert between the two webs of thermoplastic material. Moreover the apparatus is less susceptible to wear and uniform results can be achieved. The apparatus can also be used with insert material of any suitable weight per unit area.

A characteristic feature of this invention is that the insert material is supplied in web form, wound on a roll, and provided with a series of longitudinally spaced transverse perforations, or similar weakening means. There is a continuous feeding in of the insert sheets between the two thermoplastic webs at a rate conforming to the speed at which the continuously moving outer webs meet. In order to sever the insert sheets from the originally continuous webs, weakened in the area where they are subsequently to be severed, nip rolls, which bring the two plastic webs together, are revolved at a peripheral speed higher than that of the insert feed rolls. Since on one side of the perforations an insert is gripped by the feed rolls and on the other side of the perforations (i.e. in the transport direction) the preceding insert is gripped by the rolls which bring the plastic webs together, and these latter rolls perform a pulling action on the insert material, the insert web is torn along the perforation and individual insert sheets are severed from the web in succession. The severing force is increased with an increased difference in the peripheral speeds between the feed rolls and the rolls causing the plastic webs to meet. Also, the intervals between adjacent insert sheets, resulting from the severing operations, likewise increase so that by varying the difference in speeds the distance between adjacent inserts can be adjusted at will.

The distance between the line of contact of the two feed rolls and the line of contact of the two rolls conveying the plastic webs should be greater than the width of one insert and smaller than twice this width. In this manner it is reliably ensured that the feed rolls grip one insert and the rolls conveying the plastic webs grip the preceding insert so that the web of inserts is severed in the area between the two different pairs of rolls.

The force required to sever two consecutive inserts can be produced when the feed rolls and the rolls conveying the plastic webs are of equal diameter but the latter rolls revolve at a higher rotational speed. To achieve the same effect with identical speed of rotation of the rolls there may be used for advancing the plastic webs rolls of a larger diameter.

A further feature of the invention is to make variable the distance separating the feed rolls from the rolls causing the plastic webs to meet. In this manner, it is not only possible to adapt the device to various widths of inserts but also to vary the distance between two consecutive severed inserts. This distance will be increased with an increase in the distance separating the two aforementioned pairs of rolls. Due to the possibility of varying the distance between the various rolls and also of varying the differential peripheral speeds thereof, either by varying the speed of rotation or the diameter, the desired interval between two adjacent inserts of any desired width, after they have been severed, can be varied at will. It is of particular advantage to provide, between the feed rolls and the rolls conveying the plastic webs, rolls to perform the sheet-detaching function of the plastic web rolls. This feature offers the advantage that the entire installation becomes even more flexible and a device for making pouches in a synchronized manner can be made independent of the device for severing, and adjusting the interval between, the inserts. This makes it possible to design the device for feeding the inserts as a unit separate from a pouch-making machine so that these two units can be detachably connected as required. It is also possible to interchange the sheet-detaching rolls for rolls of a different size without the necessity of changing the pouch-making unit in any way.

It is advantageous when the distance from the line of contact between the two insert web feed rolls and the line of contact of the two sheet-detaching rolls is greater than the width of one insert and smaller than twice the width of one insert, and the distance between the two pairs of rolls preferably should be variable. The same is true of the selection of the diameters or rotational speeds of the detachment rolls in relation to the feed rolls.

It is further advantageous that the two detachment rolls be located at a variable distance from each other. In this manner the pull acting on the insert can be adjusted and the thickness of the insert can be taken into consideration. As the distance between the detachment rolls increases, the detachment force decreases. Thus, by making the distance between the detachment rolls variable, any contingency arising in the use of the device may be compensated.

The detachment rolls are advantageously provided with a profiled surface. The tensile force needed for severing can be thereby increased because the inserts are gripped more firmly, and the profiling of the roll surface provides for automatic adaptation to inserts of varying thicknesses.

In many cases it is desirable if a single pair of detachment rolls is replaced by a system comprising two upper and two lower rolls with two endless bands or belts being mounted thereon, one around the upper rolls and the other around the lower rolls. This ensures a particularly favorable guidance of the inserts because they are not gripped along a thin line normal of the direction of travel but over a large area. When the inserts are gripped over a large area, the contact pressure per unit area may be low and yet suffice to produce the tensile force required for severing. The endless belts also may be profiled on the exterior thereof to enhance their gripping effect; this is often advantageous when inserts are used having a smooth, and possibly varnished, surface.

The invention will be further illustrated by the accompanying drawings in which:

FIGURE 1 is a perspective diagrammatic representation of an entire installation for making pouches with inserts, including the means used for producing a combined web, the apparatus being shown as it appears in operation, and FIGURE 2 is a side elevation of a modification of the device of FIGURE 1 for feeding in the inserts.

Referring to FIGURE 1 of the drawings, a roll 10 of a thermoplastic film web 11 and a roll 12 of a thermoplastic film web 13 are being unrolled by the rolls 14 and 15 which cause the webs 11 and 13 to meet. Before they meet, that side of the web 13 and/or 11 which becomes the inside may be given a layer of an adhesive as at 16. At a predetermined spacing, a series of inserts 17, 17a, 17b, etc. are introduced, as described below, so that when the two thermoplastic webs meet, only the two marginal portions thereof make contact. After the meeting of the marginal portions of the thermoplastic webs, they are simultaneously welded together and trimmed by conventional means. The resulting tube, which is provided with spaced inserts, lies flat, being sealed by two longitudinal marginal seams, and then by longitudinal folding for partial doubling and transverse separation welding, it is converted into pouches, each having an insert and a cover flap. It is also possible to manufacture other bags with an insert, for example wrappers for stockings, outer jackets for records, and the like.

The inserts, 17, 17a, 17b, etc. are originally in the form of a continuous web wound on a roll 18 with lines of perforations 19 across the web. The original continuous web of inserts is conveyed by a top roll 20 and a bottom roll 21 towards the meeting film webs 11 and 13. The rolls 14 and 15, which cause the webs 11 and 13 to meet, also grip the insert 17. The transport speed of the rolls 14 and 15 is greater than that of the feed rolls 20 and 21, either because of their higher rotational speed compared with the rolls 20 and 21 or, if the rotational speeds are equal, due to their larger diameter, so that a tensile force acts upon the insert 17 thereby detaching it from the subsequent insert 17a of the web along one of the perforated lines. The greater the differential transport speed, the greater becomes the tearing force and the greater the interval between the severed insert 17 and the succeeding insert 17a. The distance between the pair of rolls 14 and 15 and the pair of feed rolls 20 and 21 is variable.

FIGURE 1 further shows the advantageous provision of specific detachment rolls 22 and 23 which perform the detachment function of the rolls 14 and 15. The distance between the detachment rolls 22 and 23 and the feed rolls 20 and 21 is also variable and is such that, by a suitable selection either of the rotational speeds or of the diameters, the tearing force and/or the desired interval between inserts after severance can be adjusted at will. The inserts are presented within the nip of the rolls 14 and 15 on a table, not illustrated. The insert web may be similarly supported in its approach to the rolls 22 and 23.

FIGURE 2 shows the rolls 14 and 15 and the feed rolls 20 and 21, as in FIGURE 1. For detachment in this case the rolls 22 and 22a, and 23 and 23a having the endless belts 24 and 25, with a profiled or otherwise roughened surface, are employed. FIGURE 2 specifically shows how the rolls 22 and 23 grip the insert 17, and how the feed rolls 20 and 21 grip the succeeding insert 17a. The inserts 17 and 17a are severed within the area between the detachment rolls and the feed rolls. The distance between the pair of rolls 22 and 23 and the pair of feed rolls 20 and 21 is greater than one insert width (i.e., the distance between two lines of perforations 19 of the inserts) and smaller than twice the width of an insert. This ensures at all times the gripping of the one insert by the special detachment rolls (or, when these are omitted, by the rolls 14 and 15 used to bring the film webs 11 and 13 together) and the gripping of the following insert by the feed rolls 20 and 21. The distance between the rolls 22 and 23 can be adjusted so that inserts of different thicknesses can be accommodated and the tearing force can be varied as desired. The distance between the belts 24 and 25 (see FIG. 2) can also be varied, and it is possible to do this in timed relation with the feed so that the tearing force and the intervals at which succeeding inserts are fed in between the rolls 14 and 15 can be varied at will.

It will be obvious to those skilled in the art that many modifications may be made within the scope of the present invention without departing from the spirit thereof, and the invention includes all such modifications.

What is claimed is:

1. A method for the manufacture of a composite web which comprises contacting two webs of thermoplastic material and positioning individual inserts between them, the inserts being supplied from a web of material having a succession of transverse weakened zones therein and being introduced between the thermoplastic webs by being successively detached and spaced apart between the webs, the webs overlapping the inserts and being welded on the longitudinal edges thereof.

2. A method according to claim 1 in which the composite web is longitudinally folded to form a partially doubled web, transversely welded between successive inserts and separated along the transverse welds.

3. An apparatus for use in the manufacture of a composite web comprising a pair of nip rolls for contacting two thermoplastic webs passed therebetween, means for supplying a succession of inserts between the webs, the inserts being supplied from a web of material having a succession of transverse weakening means therein, means for detaching the inserts from the web, and means for welding the longitudinal edges of the thermoplastic webs.

4. An apparatus according to claim 3 in which the inserts are detached by two pairs of rolls, one pair of which rotates at a speed different from the speed of the other pair.

5. An apparatus according to claim 4 in which the distance between the two pairs of rolls is greater than the width of one insert and less than twice the width thereof.

6. An apparatus according to claim 3 in which the inserts are detached by two pairs of rolls rotating at the same speeds, one pair of the rolls having diameters smaller than the diameters of the rolls of the other pair.

7. An apparatus according to claim 3 in which the inserts are detached by two pairs of rolls having a variable distance between them.

8. An apparatus according to claim 3 in which the inserts are detached by two pairs of rolls, one pair of which also passes the individual inserts to the nip rolls for contacting the thermoplastic webs.

9. An apparatus according to claim 8 in which the distance between the two pairs of detachment rolls is greater than the width of one insert and less than twice the width thereof.

10. An apparatus according to claim 8 in which one pair of the detachment rolls rotates at a speed different from the speed of the other pair.

11. An apparatus according to claim 8 in which the distance between the axes of the pairs of detachment rolls is variable.

12. An apparatus according to claim 8 in which the detachment rolls have profiled surfaces.

13. An apparatus according to claim 3 in which the inserts are detached by passing first between a pair of rolls and then between a pair of endless belts, the latter running at a greater speed than the peripheral speed of the former.

References Cited

UNITED STATES PATENTS

| | | | |
|---|---|---|---|
| 3,105,417 | 10/1963 | Hammer | 93—35 |
| 3,168,016 | 2/1965 | Kehr | 93—8 |
| 3,226,911 | 1/1966 | Vreeland et al. | 53—28 |

BERNARD STICKNEY, *Primary Examiner.*